United States Patent Office 3,654,208
Patented Apr. 4, 1972

3,654,208
METHOD OF REDUCING THE ANTIFREEZE CONCENTRATION IN EMULSIONS OF VINYL CHLORIDE POLYMERS
Graham John Blake, Runcorn, England, assignor to Imperial Chemical Industries Limited, London, England
No Drawing. Filed Apr. 17, 1970, Ser. No. 29,694
Claims priority, application Great Britain, Apr. 23, 1969, 20,805/69
Int. Cl. C08f 3/30
U.S. Cl. 260—29.6 ME
7 Claims

ABSTRACT OF THE DISCLOSURE

A process for improving the stability of an emulsion of vinyl chloride polymer which has been prepared at a temperature below 0° C. in an aqueous medium containing sufficient antifreeze to maintain the polymerization medium liquid at the polymerization temperature which comprises reducing the concentration of the antifreeze in the emulsion preferably by subjecting the emulsion to the dialysis through a membrane permeable to antifreeze and water.

---

This invention relates to the preparation of emulsions of vinyl chloride polymers of improved stability which are suitable for conversion to fibres.

It is known that vinyl chloride polymer emulsions may be prepared by polymerisation of vinyl chloride in an aqueous medium in the presence of an emulsifying agent. The process is known as emulsion polymerisation.

It is also known that emulsion polymerisation of vinyl chloride at temperatures below 0° C. favours the production of a polymer which is less branched than that produced at higher temperatures, which contains a greater proportion of syndiotactic, crystalline polymer and which is particularly suitable for conversion to fibres.

Where vinyl chloride is polymerised at a temperature below 0° C., say between 0° C. and —40° C., it may be necessary, particularly at lower temperatures within this range, to effect the polymerisation in the presence of suitable amounts of a compound or mixture of compounds, hereinafter referred to as antifreeze, which is miscible with water and which depresses the freezing point of water so as to maintain the polymerisation medium liquid at the polymerisation temperature.

The concentration of antifreeze in the aqueous polymerisation medium will depend on the temperature at which polymerisation is to be effected and on the nature of the antifreeze, but in general amounts of at least 5%, and often up to 25% or greater are required. For example, at a polymerisation temperature of —20° C., vinyl chloride may suitably be polymerised in a medium comprising approximately equal proportions by weight of water and antifreeze.

Even in the presence of relatively large amounts of emulsifying agent, the emulsions of vinyl chloride polymers prepared in an aqueous medium containing antifreeze may be relatively unstable and thus can be stored only for relatively short periods of time, if at all, and soon achieve a consistency which is unsuitable for use in conversion to fibres by an emulsion spinning process.

We have now discovered a process by which the stability of aqueous vinyl chloride polymer emulsions containing antifreeze may be improved so that they may be stored for a considerable period of time.

According to the present invention we provide a process for improving the stability of an aqueous emulsion of vinyl chloride polymer which has been prepared by polymerising vinyl chloride at a temperature below 0° C. in an aqueous medium containing sufficient antifreeze to maintain the polymerisation medium liquid at the polymerisation temperature which comprises reducing the concentration of antifreeze in the emulsion.

The term 'vinyl chloride polymer' as used throughout this specification includes homopolymers of vinyl chloride and copolymers of vinyl chloride with other monomers copolymerisable therewith, e.g. up to 30 mole percent of such copolymerisable monomers.

The process of our invention is most useful in improving the stability of vinyl chloride polymer emulsions which contain a high proportion of antifreeze, for example, of the order of 25% by weight or greater, although it is to be understood, of course, that the stability of emulsions containing less than 25% by weight of antifreeze may also be improved. However, where the emulsion contains, for example, 5% by weight or less of antifreeze, little or no improvement in stability may be obtained by reduction of the antifreeze concentration.

Where the nature of the antifreeze permits, its concentration in the emulsion may be reduced by evaporation. The antifreeze may be allowed to evaporate provided the emulsion remains stable during the evaporation procedure. Alternatively, the antifreeze may be caused to evaporate, e.g. by warming the emulsion or by passing air through the emulsion, care being taken that the emulsion remains stable during the evaporation.

In an alternative method, which is more generally applicable, the concentration of antifreeze in the emulsion may be reduced by subjecting the emulsion to dialysis through a membrane permeable to the antifreeze and water, for example, by placing the emulsion on one side of and in contact with the membrane, water being placed on the other side of and in contact with the membrane. Suitably, the emulsion may be placed in a container formed of the dialysis membrane and, if excessive dilution of the emulsion due to diffusion of water into the container is to be avoided, it is preferred to use a sealed container. Where a sealed container is used it may, of course, be completely immersed in water, if desired. It is preferred to use distilled water. Dialysis may also remove some of the emulsifying agent from the emulsion and it may be desirable to replace some at least of the lost emulsifying agent after dialysis in order to aid the stabilisation.

The nature of the dialysis membrane to be used will be determined by the composition of the aqueous medium. For example, where the aqueous medium comprises water and ethylene glycol, or water, ethylene glycol and methanol, the dialysis membrane may suitably be formed of regenerated cellulose, e.g. a regenerated cellulose film.

Progressive reduction of the concentration of the antifreeze in the emulsion generally leads to a progressive increase in the stability of the emulsion, that is, progressively increasing periods of time elapse before the emulsion coagulates into discrete particles visible to the naked eye. The extent of the reduction of the aforementioned concentration to be achieved will depend on the degree of stability which is desired, and on the effectiveness of the particular emulsifying agent, which may be cationic, anionic or non-ionic, present in the emulsion. Thus, in order to produce a vinyl chloride polymer emulsion of a given stability the extent of the reduction of the aforementioned concentration may need to be somewhat less where the emulsion is stabilised by a particularly effective emulsifying agent than is the case where a less effective emulsifying agent is used.

We have found that particularly effective emulsifying agents for use in the polymerisation of vinyl chloride in an aqueous medium at temperatures below 0° C. are soluble salts of a sulphonic acid derivative of an alkyl phenoxy polyether, alcohol, said derivative having the formula

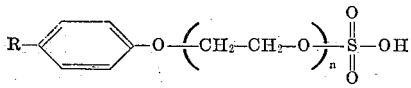     I where R is an alkyl group of from 5 to 20 carbon atoms and $n$ is a whole number of from 2 to 12, as described in our copending application U.S. Serial No. 29,693 filed April 17, 1970. Suitably the salt is a sodium or ammonium salt.

Where the emulsion is to be stored for a period of more than a few days it is generally preferred to reduce the concentration of the antifreeze to less than 15% by weight of the emulsion.

The aqueous emulsions of vinyl chloride polymer may be converted into fibers, for example, by dissolving a fiber-forming polymeric material in the emulsion, referred to as the matrix, and spinning the mixture through at least one orifice into a medium, referred to as the coagulant, in which the matrix is precipitated into a fibrous structure in which the particles of vinyl chloride polymer are embedded. The thus formed spun structure may be improved in strength by fusing together, or coalescing, the particles of vinyl chloride polymer.

Where the aqueous emulsion is to be converted to fibers, as described above, we have found it to be advantageous to reduce the concentration of antifreeze in the emulsion to less than 5% by weight of the emulsion, as addition of the matrix to the emulsion prior to spinning may result in undesirable coagulation of the emulsion if the concentration of antifreeze is not so reduced, depending of course on the nature of the matrix.

The invention is now illustrated by the following examples in which all parts are expressed as parts by weight. By intrinsic viscosity we mean the value obtained for $$\frac{t-t_o}{t_o C}$$

extrapolated to zero concentration, where $t$ is the flow time of a solution of the polymer at a concentration of $C$ g./decilitre of solvent through a viscometer, and $t_o$ is the flow time of the same volume of pure solvent through the same viscometer under the same conditions.

In the following examples the viscosities of the polymer were measured at 25° C. in solution in cyclohexanone.

EXAMPLE 1

A flanged-neck polymerisation vessel fitted with a stirrer, a condenser, a pressurised container for liquid vinyl chloride, a thermometer, a nitrogen inlet and outlet and an injection port for introduction of polymerisation medium and catalyst solutions was charged with a polymerisation medium of 162 parts of water, 150 parts of ethylene glycol and a mixture in 12 parts of water of an emulsifying agent comprising 21 parts of a solution containing 28% by weight of a sodium salt of an ω-(nonylphenyl) polyethylene oxide sulfonic acid, said acid having the structure I where R is a nonyl group and $n$ is 4, which solution is sold commercially as Fenopon CO–433 (Fenopon is a registered trademark).

The polymerisation medium was buffered to pH 3 by addition of a aqueous mixture of phosphoric acid and sodium hydroxide having a pH of 1. The polymerisation medium was stirred and a stream of nitrogen passed through the polymerisation vessel.

The polymerisation vessel was cooled to a temperature of −20° C. When the contents of the polymerisation vessel had reached a temperature of −20° C. the flow of nitrogen was stopped and a slight positive pressure of nitrogen was maintained in the polymerisation vessel.

300 parts of liquid vinyl chloride were then run into the polymerisation vessel from the container, the sodium salt thus being present in a concentration of 1.96% by weight of the vinyl chloride charged to the polymerisation vessel, and after allowing time for the vinyl chloride to cool to −20° C. in the polymerisation vessel polymerisation was initiated by addition of 0.93 part of ascorbic acid and 0.03 part of ferrous sulfate each dissolved in 17.6 parts of a mixture of ethylene glycol and water in the same proportions as used in the polymerisation medium, followed by 0.25 part of ammonium persulfate as a solution in 6 parts of the same ethylene glycol/water mixture. Further portions of 0.25 part of ammonium persulfate in solution as used above were added after 40 minutes and 60 minutes.

The polymerisation mixture was stirred for 6 hours and then the polymerisation vessel was allowed to warm to room temperature.

At the end of the polymerisation the emulsion was removed from the polymerisation vessel and filtered through a paint filtration cloth. 537 parts of the emulsion were recovered after filtration.

The solids content of the emulsion, that is the proportion of vinyl chloride polymer in the emulsion, was determined by adding a saturated solution of potassium aluminum sulfate in water to a weighed sample of the emulsion. The precipitated polymer was filtered, washed with water and methanol and dried to constant weight in a vacuum oven at 50° C. to 60° C. The emulsion contained 26.9% solids by weight and the vinyl chloride polymer was produced in a yield of 49%.

A further sample of the emulsion recovered from the filtration stage was allowed to stand at room temperature. The emulsion remained uncoagulated after standing for 2 days but thereafter began to coagulate into discrete particles visible to the naked eye.

A further sample of the emulsion recovered from the filtration stage was immediately charged into a regenerated cellulose tube, Visking Tubing (Scientific Instrument Centre Ltd.), the lower end of which was closed. The tube was filled by the emulsion, the open end sealed and the tube and contents subjected to dialysis by immersing the tube for 10 hours in a stream of distilled water.

The tube was then removed from the water and opened and a further 1 part of emulsifying agent added to the emulsion for every 100 parts of the emulsion. Gas liquid chromatography indicated a substantial reduction in the concentration of ethylene glycol in the emulsion. The emulsion remained stable and suitable for conversion to fibres by emulsion spinning, and even after standing for 200 days there was no sign of coagulation into discrete particles visible to the naked eye. The solids content of the emulsion after dialysis was 23%.

EXAMPLE 2

The polymerisation procedure of Example 1 was followed using 590 parts of vinyl chloride, a polymerisation medium of 600 parts of water, ethylene glycol and methanol in the proportion water:ethylene glycol:methanol of 65:15:20 parts by volume and 36 parts of a solution containing 88% by weight an ammonium salt of a sulfonic acid of Formula I in which R is a nonyl group and $n$ is 4 (Perlankrol PA conc., Lankro Chemicals Limited) (i.e. 5.38% by weight of the ammonium salt by weight of vinyl chloride).

Polymerisation was initiated by addition of 0.93 part of ascorbic acid and 0.03 part of ferrous sulfate dissolved respectively in 15 parts and 7.5 parts of water, ethylene glycol and methanol in the same proportions as used in the polymerisation medium followed by 0.25 part of ammonium persulfate in 5 parts of the same water, ethylene glycol, methanol mixture. Further portions of 0.25 part of ammonium persulfate were added after 40 and 60 minutes.

The polymerisation was continued for 6 hours, 0.3 g. of quinol were added and the polymerisation vessel was allowed to warm up to room temperature.

The emulsion, which showed no sign of coagulation visible to the naked eye was filtered as in Example 1 and 1137 parts of the emulsion were recovered. The solids content of the emulsion was 37.5%.

A sample of the emulsion recovered from the filtration stage was allowed to stand at room temperature. The emulsion was stable for a few days and thereafter the emulsion coagulated into discrete particles visible to the naked eye. After standing for 90 days the vinyl chloride polymer in the emulsion was completely precipitated.

A further sample of the emulsion recovered from the filtration stage was subjected to dialysis following the procedure described in Example 1. Gas-liquid chromatography indicated a substantial reduction in the concentration of ethylene glycol and methanol in the emulsion. The solids content of the emulsion after dialysis was 33.8% and the vinyl chloride polymer had an intrinsic viscosity of 4.2 decilitre g.$^{-1}$. After dialysis the emulsion remained stable and uncoagulated after standing for 90 days and was suitable for conversion to fibers.

EXAMPLE 3

The polymerisation procedure of Example 1 was followed using 295 parts of vinyl chloride, a polymerisation medium of 150 parts of water and 150 parts of ethylene glycol and 52.5 parts of a solution of the sodium salt of the sulfonic acid of Formula I as used in Example 1 (i.e. 4.97% by weight of the said sodium salt by weight of vinyl chloride).

Polymerisation was initiated following the procedure described in Example 2, except that the ascorbic acid, ferrous sulfate and ammonium persulfate were dissolved in water and ethylene glycol in the proportions used in the polymerisation medium and after stirring for 5½ hours the polymerisation vessel was allowed to warm up to room temperature. The emulsion which showed no signs of coagulation visible to the naked eye, was filtered as in Example 1 and shown to contain 32.9% by weight solids and was then divided into eight approximately equal portions.

TABLE 1

| Time of dialysis, hour | Percent by weight of ethylene glycol in emulsion | | Comments |
|---|---|---|---|
| | Before dialysis | After dialysis | |
| 0 | 24.1 | | After standing for 5 days the emulsion showed visible signs of coagulation. |
| 1 | | 15.7 | After standing for 100 days no sign of coagulation visible to the naked eye. |
| 2 | | 10.6 | Do. |
| 6 | | 2.4 | Do. |
| 8 | | 1.8 | Do. |
| 10 | | 1.4 | Do. |
| 300 | | 0.5 | Do. |

A 10 ml. sample of one of the portions was added to 90 ml. of a saturated solution of potassium aluminum sulfate in water. The vinyl chloride polymer was precipitated and the liquid phase was analysed by gas-liquid chromatography on a 6 ft. long 10% Carbowax on Embacel (60/80 mesh) column at 140° C. in a Perkin-Elmer F11 machine using butane-1,3-diol on an internal standard.

The proportion of ethylene glycol in the emulsion removed from the polymerisation vessel is given in Table 1.

The remaining portions of the emulsion were sealed in separate tubes of regenerated cellulose and subjected to dialysis following the procedure described in Example 1 except that the tubes were immersed in distilled water and dialysed for periods of time indicated in Table 1, the water being replaced by fresh distilled water every ½ hour.

The tubes were then opened and 10 ml. of each of the emulsions added to 90 ml. of a saturated solution of potassium aluminum sulfate in water. The vinyl chloride polymer in each of the samples was precipitated and each of the resulting liquid phases was analysed following the above procedure. Table 1 indicates the concentration of ethylene glycol in the emulsions expressed as a percentage of the total weight of each of the emulsions after dialysis.

What we claim is:

1. A process for improving the stability of an emulsion of solid vinyl chloride homopolymer which has been prepared at a temperature below 0° C. in an aqueous medium which contains more than 5% of an antifreeze selected from the group consisting of ethylene glycol and methanol aind mixtures thereof which comprises reducing the concentration of the antifreeze in said emulsion.

2. A process as claimed in claim 1 in which the concentration of antifreeze in the emulsion is reduced by subjecting the emulsion to dialysis through a membrane permeable to antifreeze and water.

3. A process as claimed in claim 2 in which the emulsion is placed in a container formed of the dialysis membrane.

4. A process as claimed in claim 3 in which the container is a sealed container.

5. A process as claimed in claim 2 in which the antifreeze in the emulsion is ethylene glycol or a mixture of ethylene glycol and methanol and the dialysis membrane is formed of regenerated cellulose.

6. A process for the preparation of an emulsion suitable for storage as claimed in claim 1 in which the concentration of the antifreeze in the emulsion is reduced to less than 15% by weight of the emulsion.

7. A process for the preparation of an emulsion suitable for use in an emulsion spinning process as claimed in claim 1 in which the concentration of antifreeze in the emulsion is reduced to less than 5% by weight of the emulsion.

References Cited

UNITED STATES PATENTS

| 2,276,986 | 3/1942 | Kemp et al. | 260—821 |
| 2,604,467 | 7/1952 | Crouch et al. | 260—85.1 |
| 2,739,136 | 3/1956 | Kharasch et al. | 260—29.6 MN |

WILLIAM H. SHORT, Primary Examiner

L. M. PHYNES, Assistant Examiner

U.S. Cl. X.R.

260—29.2 UA, 87.5, 92.8 A & W; 210—22